United States Patent
Kusuda

(10) Patent No.: US 10,587,770 B2
(45) Date of Patent: Mar. 10, 2020

(54) OPTICAL SCANNING DEVICE

(71) Applicant: Brother Kogyo Kabushiki Kaisha, Nagoya-shi, Aichi-ken (JP)

(72) Inventor: Shinya Kusuda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/939,428

(22) Filed: Mar. 29, 2018

(65) Prior Publication Data

US 2018/0288263 A1 Oct. 4, 2018

(30) Foreign Application Priority Data

Mar. 31, 2017 (JP) ................................ 2017-069480

(51) Int. Cl.
| | |
|---|---|
| *H04N 1/028* | (2006.01) |
| *H04N 1/00* | (2006.01) |
| *G03G 15/08* | (2006.01) |
| *G03G 15/043* | (2006.01) |
| *G03G 15/20* | (2006.01) |

(52) U.S. Cl.
CPC ....... *H04N 1/0283* (2013.01); *G03G 15/0435* (2013.01); *G03G 15/0865* (2013.01); *H04N 1/00278* (2013.01); *G03G 15/2053* (2013.01)

(58) Field of Classification Search
None
See application file for complete search history.

(56) References Cited

U.S. PATENT DOCUMENTS

| | | | |
|---|---|---|---|
| 7,995,087 B2 | 8/2011 | Kato | |
| 9,201,238 B2 | 12/2015 | Kusuda | |
| 2002/0084401 A1* | 7/2002 | Tsai | ........................ F16M 7/00 |
| | | | 248/650 |
| 2004/0184128 A1* | 9/2004 | Mikami | ............... G02B 26/121 |
| | | | 359/221.2 |
| 2006/0285170 A1* | 12/2006 | Mamiya | ................... B41J 2/471 |
| | | | 358/305 |
| 2009/0109273 A1 | 4/2009 | Kato | |

(Continued)

FOREIGN PATENT DOCUMENTS

| | | |
|---|---|---|
| JP | S63-287816 A | 11/1988 |
| JP | 2006-150779 A | 6/2006 |

(Continued)

*Primary Examiner* — Huo Long Chen
(74) *Attorney, Agent, or Firm* — Banner & Witcoff, Ltd.

(57) ABSTRACT

In an optical scanning device, an optical deflector includes a base plate, a rotor having an axis of rotation orthogonal to the base plate, and a polygon mirror fixed to the rotor. The polygon mirror has a plurality of reflecting surfaces tilted at a predetermined angle with respect to the axis of rotation. Protrusions protruding from a bottom surface of a frame have bearing surfaces at respective distal ends thereof; and the bearing surfaces are in contact with the base plate. The bottom surface includes a first region on which a first protrusion is disposed, and a second region on which a second protrusion is disposed, and a distance between the first region and a scanning plane containing optical axes in cross sections taken along a sub scanning direction of a scanning lens is different from a distance between the second region and the scanning plane.

8 Claims, 9 Drawing Sheets

(56) References Cited

U.S. PATENT DOCUMENTS

| | | | |
|---|---|---|---|
| 2010/0229442 A1* | 9/2010 | Snow | A47G 1/065 40/761 |
| 2012/0033315 A1* | 2/2012 | Song | G02B 26/121 359/876 |
| 2014/0158874 A1 | 6/2014 | Kusuda | |
| 2014/0160217 A1* | 6/2014 | Nagatoshi | G03G 21/1666 347/118 |
| 2015/0226958 A1* | 8/2015 | Hayakawa | G02B 26/12 359/200.1 |

FOREIGN PATENT DOCUMENTS

| | | | |
|---|---|---|---|
| JP | 2009-103944 A | | 5/2009 |
| JP | 2013054082 A | * | 3/2013 |
| JP | 2014-115371 A | | 6/2014 |

* cited by examiner

OPTICAL SCANNING DEVICE

CROSS-REFERENCE TO RELATED APPLICATION(S)

This application claims priority from Japanese Patent Application No. 2017-069480 filed on Mar. 31, 2017, the disclosure of which is incorporated herein by reference in its entirety.

TECHNICAL FIELD

Apparatuses disclosed herein relate to an optical scanning device including a polygon mirror.

BACKGROUND ART

In an optical scanning device, a polygon mirror having a plurality of reflecting surfaces tilted at a predetermined angle with respect to an axis of rotation of the polygon mirror in a plane containing the axis of rotation may be provided. For example, a polygon mirror made of plastic may be designed, with consideration given to the draft angle of a mold used in the process of manufacture, to have a trapezoidal cross section taken along a plane containing the axis of rotation.

SUMMARY

Such a polygon mirror with tilted reflecting surfaces, when mounted in an optical scanning device, should assume a tilted position in which the axis of rotation is tilted with respect to a direction orthogonal to the optical axis, in order that the reflecting surfaces are orthogonal to the optical axis, in cross section taken along a sub scanning direction. To mount a polygon mirror in a tilted position (i.e., by setting the axis of rotation in a tilted position), the lengths of one or more of bosses (protrusions) on which the base plate for the polygon mirror is supported may be designed to vary from others; however, the greater differences in length among the bosses would increase the likelihood of undesirable vibrations occurring from the rotation of the polygon mirror.

It would be desirable to provide a vibration-preventive frame structure with which a base plate for a polygon mirror having a plurality of reflecting surfaces tilted at a predetermined angle with respect to an axis of rotation in a plane containing the axis of rotation is fastened to a frame in an optical scanning device.

In one aspect, an optical scanning device comprises: a light source configured to emit a light beam; an optical deflector configured to deflect, in a main scanning direction, a light beam emitted from the light source; a scanning lens configured to focus the light beam deflected by the optical deflector on a surface to be scanned; and a frame on which the light source, the optical deflector and the scanning lens are fixed. The frame has a bottom surface.

The optical deflector includes a base plate, a rotor having an axis of rotation orthogonal to the base plate, and a polygon mirror fixed to the rotor. The polygon mirror has a plurality of reflecting surfaces tilted at a predetermined angle with respect to the axis of rotation in a plane containing the axis of rotation. The frame includes a plurality of protrusions protruding from the bottom surface. The plurality of protrusions have a plurality of bearing surfaces at respective distal ends thereof. The plurality of bearing surfaces are in contact with the base plate. The plurality of protrusions include a first protrusion and a second protrusion. The bottom surface includes a first region on which the first protrusion is disposed, and a second region on which the second protrusion is disposed. A distance between the first region and a scanning plane containing optical axes in cross sections taken along a sub scanning direction of the scanning lens is different from a distance between the second region and the scanning plane.

BRIEF DESCRIPTION OF THE DRAWINGS

The above and other aspects, their advantages and further features will become more apparent in detail illustrative, non-limiting description with reference to the accompanying drawings, in which.

DESCRIPTION OF EMBODIMENTS

A detailed description will be given of an illustrative, non-limiting embodiment with reference made to the drawings where appropriate. In the following description, a general setup of a laser printer as an example of an image forming apparatus in which an optical scanning device is installed is described briefly, and then a detailed configuration of the optical scanning device will be discussed.

Figure 1:
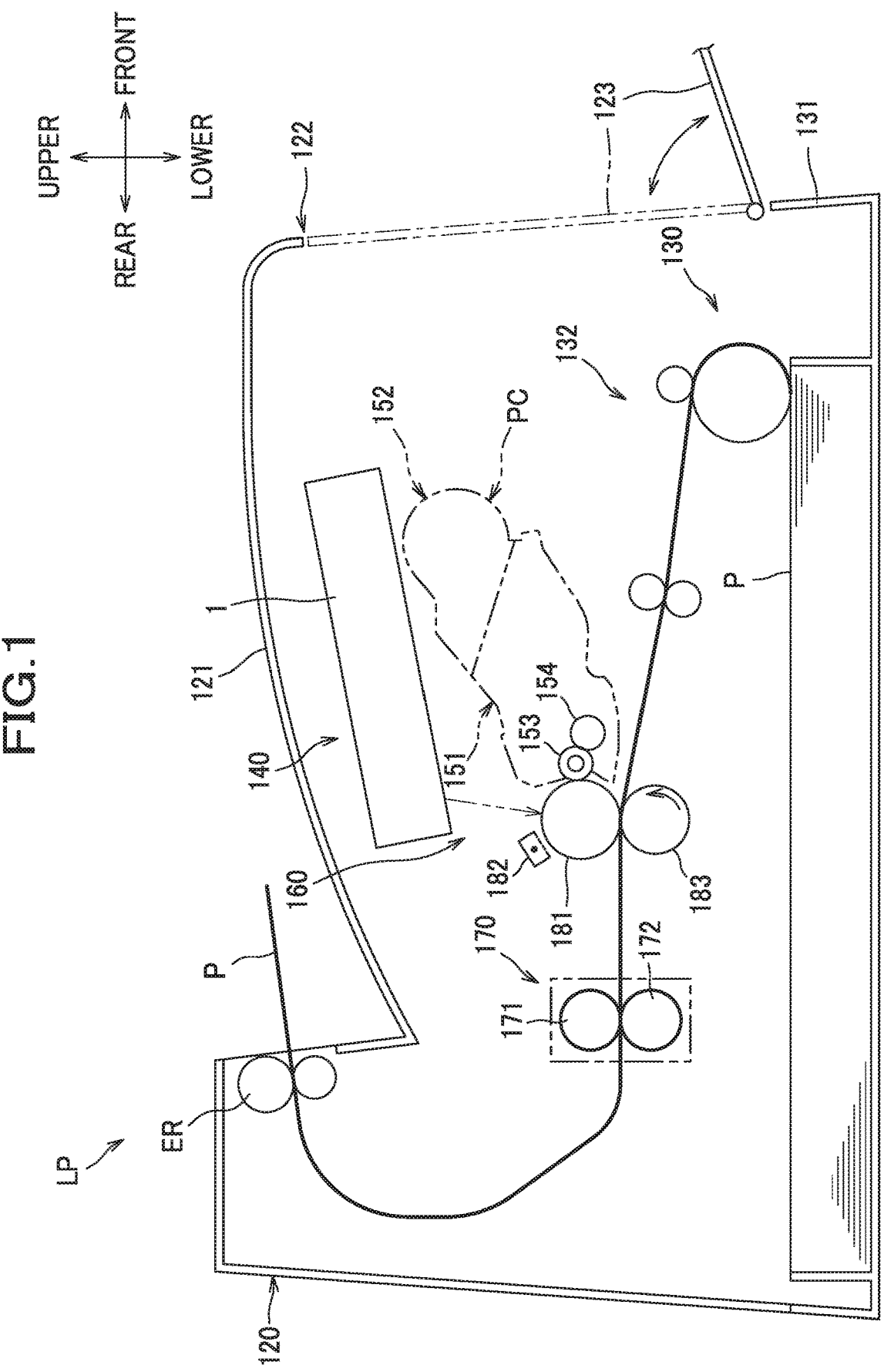
FIG. 1 is a sectional view of a laser printer including an optical scanning device.

As shown in FIG. 1, a laser printer LP includes a body casing 120 and various constituent components housed therein which include a feeder unit 130 for feeding a sheet P (e.g., of paper) and an image forming unit 140 for forming an image on the sheet P.

The feeder unit 130 includes a sheet feed tray 131 and a sheet conveyor mechanism 132. The sheet feed tray 131 is detachably attached to a lower part of the body casing 120. The sheet conveyor mechanism 132 is configured to convey sheets P stacked on the sheet feed tray 131 toward a transfer roller 183 which will be described later. The image forming unit 140 includes an optical scanning device 1, a process unit 160, and a fixing device 170.

The optical scanning device 1 is provided in an upper space inside the body casing 120, and configured to emit and deflect a laser beam so that a surface (surface to be scanned) of a photoconductor drum 181 is rapidly scanned with the laser beam. The configuration of the optical scanning device 1 will be described later in detail.

The process unit 160 includes a photoconductor drum 181, a charger 182, a transfer roller 183, and a process cartridge PC. The process cartridge PC is configured to be removable from and installable in the body casing 120 through an opening 122 openably closed by a front cover 123 provided swingably at a front wall of the body casing 120.

The process cartridge PC includes a development cartridge 151 and a toner cartridge 152. The development cartridge 151 includes a development roller 153 and a supply roller 154. Toner (developer) is stored in the toner cartridge 152. The toner cartridge 152 is configured to be detachable from and attachable to the development cartridge 151.

The supply roller 154 is a roller configured to supply toner stored in the process cartridge PC to the development roller 153. The development roller 153 is a roller configured to supply toner from the supply roller 154 to an electrostatic latent image formed on the photoconductor drum 181.

In the process unit 160, the surface of the rotating photoconductor drum 181 is uniformly charged by the charger 182, and exposed to the rapidly sweeping laser beam from the optical scanning device 1, so that an electrostatic latent image based on the image data is formed on the surface of the photoconductor drum 181.

Next, toner in the process cartridge PC is supplied to the electrostatic latent image on the photoconductor drum 181, so that a toner image is formed on the surface of the photoconductor drum 181. Thereafter, a sheet P is conveyed through between the photoconductor drum 181 and the transfer roller 183, and the toner image carried on the surface of the photoconductor drum 181 is transferred onto the sheet P.

The fixing device 170 includes a heating roller 171 and a pressure roller 172 pressed on the heating roller 171. The toner transferred on the sheet P is thermally fixed by the fixing device 170 while the sheet P passes through between the heating roller 171 and the pressure roller 172.

The sheet P on which the toner image is fixed is conveyed to sheet ejection rollers ER provided downstream of the fixing device 170, and forwarded through the sheet ejection rollers ER onto a sheet output tray 121.

Figure 2:
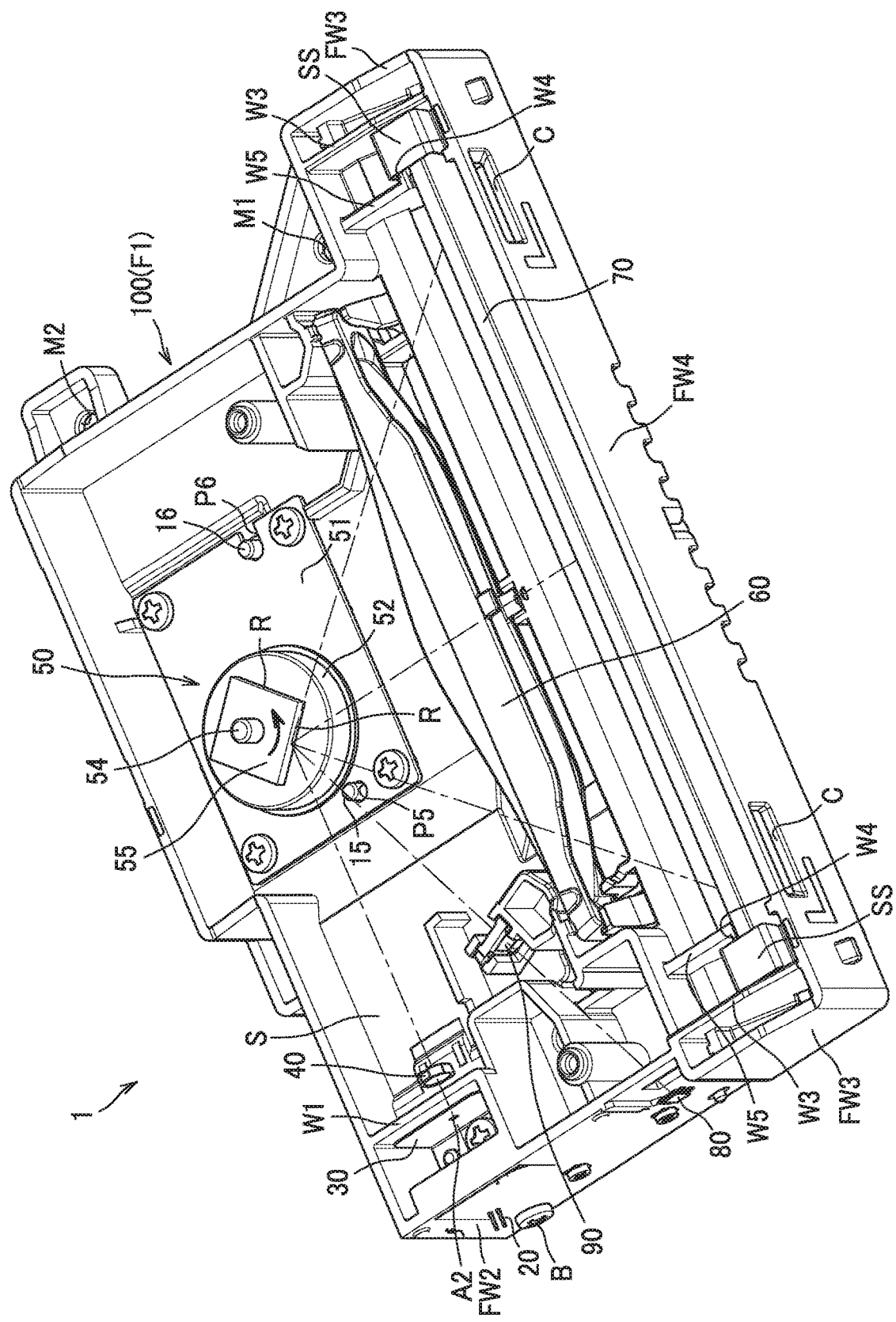
FIG. 2 is a perspective view of the optical scanning device.
Figure 3:
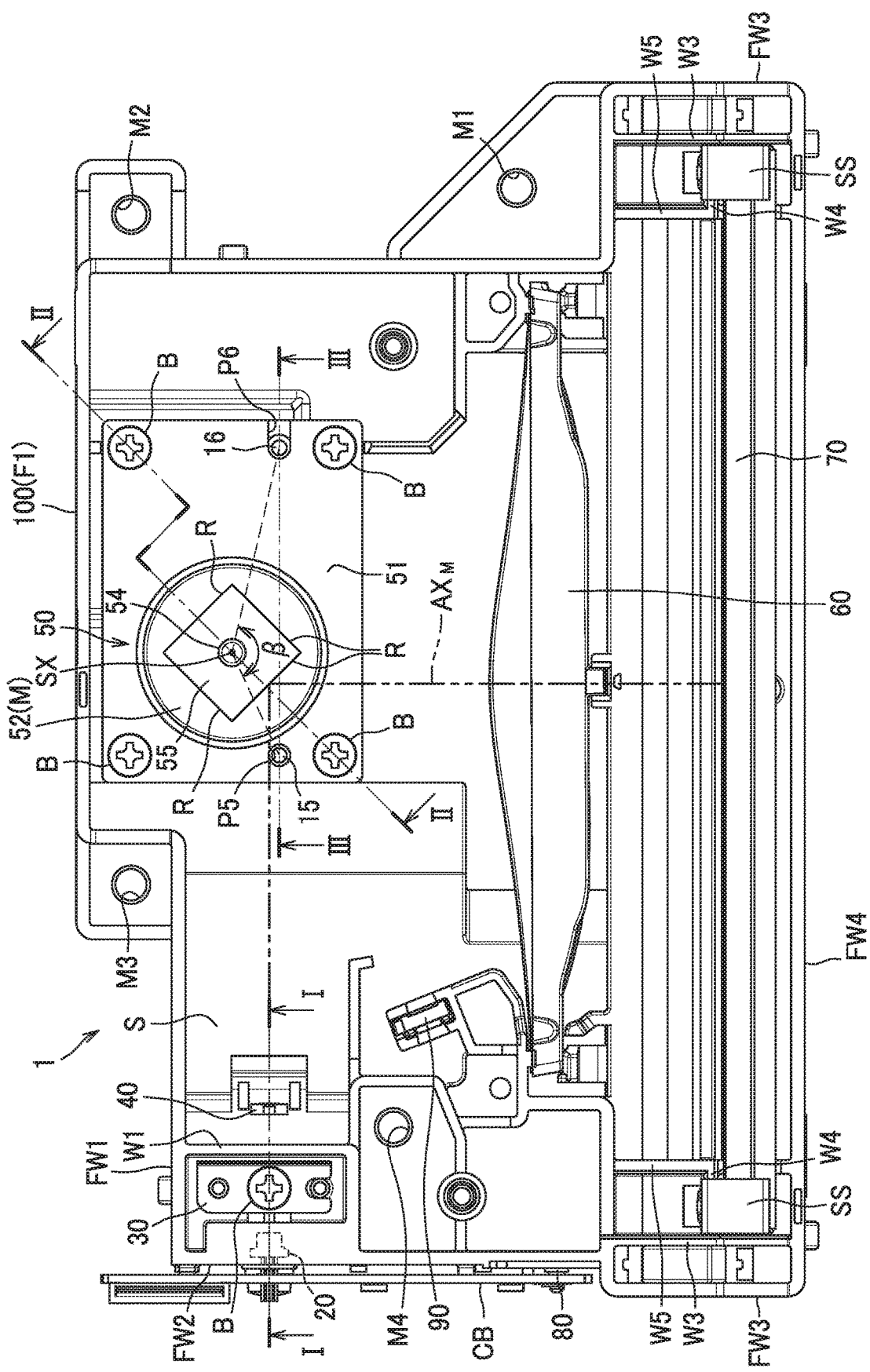
FIG. 3 is a plan view of the optical scanning device.

As shown in FIGS. 2 and 3, the optical scanning device 1 includes a plastic frame 100; various optical components such as a semiconductor laser 20, an aperture stop plate 30, a coupling lens 40, an optical deflector 50, an f-theta lens 60 as an example of a scanning lens, a turning mirror 70, a beam detect (BD) sensor 80, and a BD condenser lens 90; and a circuit board CB.

Figure 4:
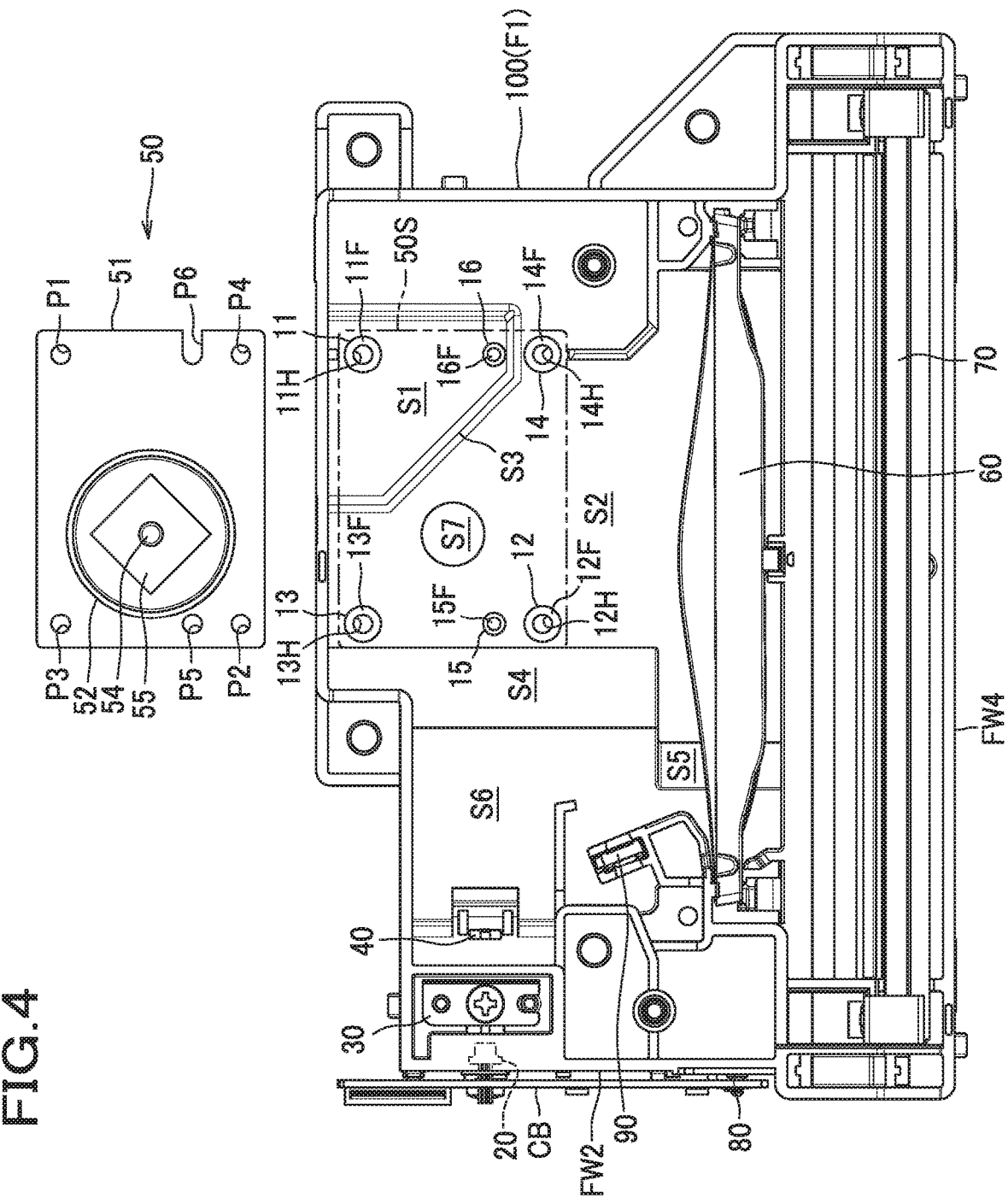
FIG. 4 is a plan view of the optical scanning device dismantled of a polygon mirror.

The frame 100 includes a first frame F1 and a second frame F2 as seen in FIGS. 2 to 6. The first frame F1 has a shape of a box (or rectangular container) with an open top as shown in FIGS. 2 to 4. The various optical components and the circuit board CB as mentioned above are fixed on the box-shaped first frame F1. The second frame F2, partially shown in FIGS. 5 and 6, forms a lid with which the top side of the first frame F1 is covered. In FIG. 2, illustration of the circuit board CB is omitted, so that an outer wall FW2 of the first frame F1 can be seen.

Figure 5:
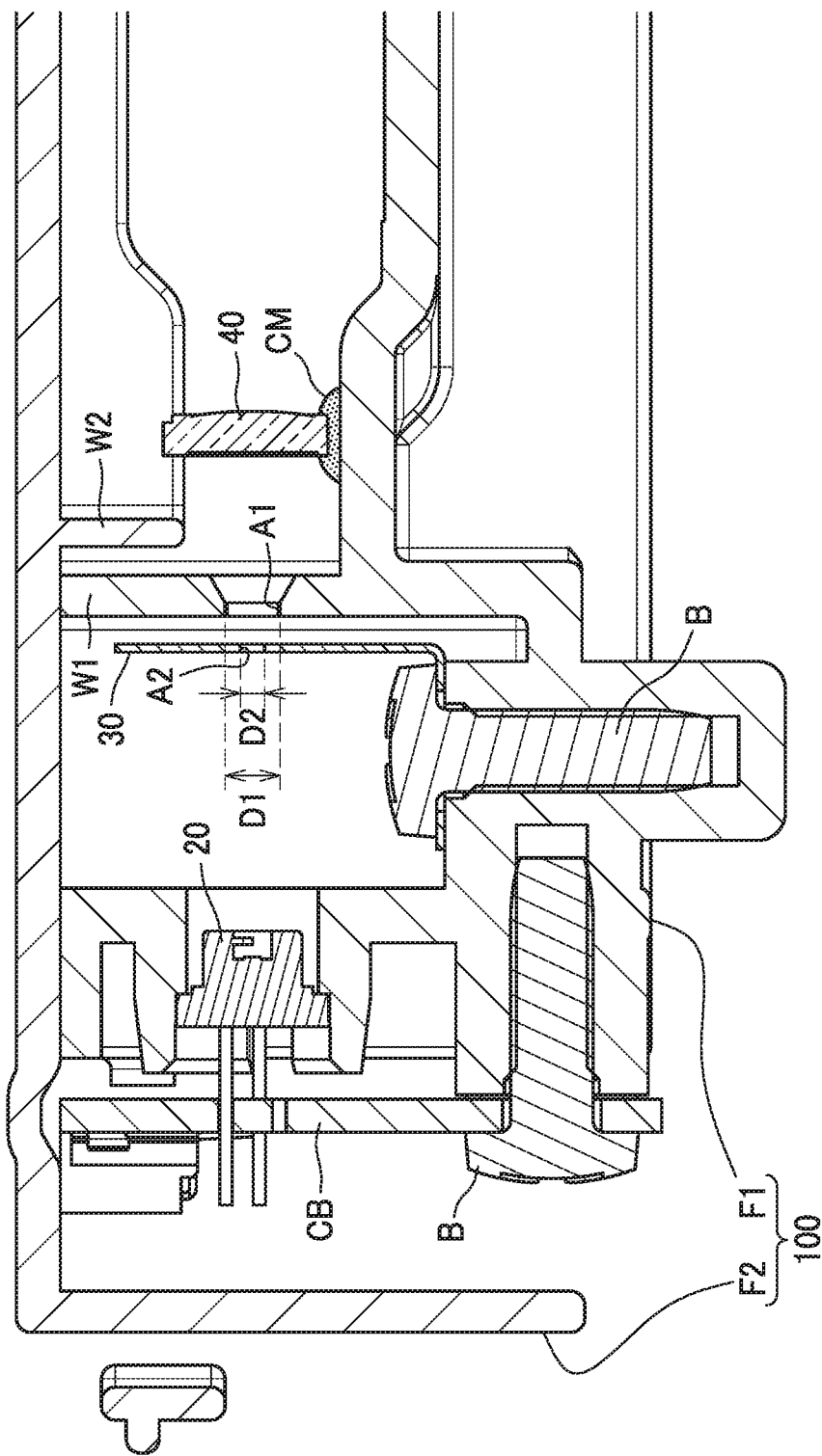
FIG. 5 is a sectional view taken along line I-I of FIG. 3.

The semiconductor laser 20 is a device configured to emit diffusive laser light. The light-emitting element of the semiconductor laser 20 is caused to blink by a controller (not shown) at times specified in accordance with the image to be formed on the scanned surface of the photoconductor drum 181. As shown in FIG. 5, terminals of the semiconductor laser 20 protrude from the circuit board CB, and are covered with the second frame F2.

The aperture stop plate 30 is a member having an opening A2 that defines sizes, in the main scanning direction and in the sub scanning direction, of the laser light coming from the semiconductor laser 20. The aperture stop plate 30 is made of substantially rectangular metal plate bent at an angle of 90 degrees, and located in place on a bottom surface S of the first frame F1 and fastened with a screw B.

The coupling lens 40 is a lens provided between the semiconductor laser 20 and the optical deflector 50 and configured to convert the light emitted from the semiconductor laser 20 and having passed through the opening A2 of the aperture stop plate 30 into a light beam which is focused in the sub scanning direction orthogonal to the main scanning direction (the direction of deflection caused by the optical deflector 50) near a reflecting surface R of the optical deflector 50 which will be described later. The coupling lens 40 is directly bonded to the first frame F1 with an adhesive CM. The semiconductor laser 20, the aperture stop plate 30 and the coupling lens 40 constitute a light source configured to emit a light beam.

As shown in FIGS. 2 to 5, an exit-side face of the semiconductor laser 20 and the aperture stop plate 30 are disposed in a section inside the frame 100, which is isolated from the other sections in which the other optical components are disposed. To be more specific, the section in which the semiconductor laser 20 and the aperture stop plate 30 are disposed is provided on the bottom surface S of the first frame F1 and partitioned off with a wall W1 which is shaped substantially like a letter L and which connects adjacent outer walls FW1, FW2 of the first frame F1.

The wall W1 extends from the bottom surface S of the first frame F1 upward to such a level that an upper end of the wall W1 contacts the second frame F2 (see FIG. 5). Therefore, once the second frame F2 is mounted on the first frame F1, the section in which the semiconductor laser 20 is disposed can be protected from dust or the like.

The wall W1 has an opening A1 through which a light beam having passed through the opening A2 of the aperture stop plate 30 is allowed to pass so as to enter the coupling lens 40. The diameter D1 of the opening A1 is larger than the diameter D2 of the opening A2. The opening A1 may have any shape, dimension and location without limitation as long as the light beam is not hampered from passing therethrough, but may be designed to have a reduced or minimized size so as to prevent entry of dust or the like therethrough.

Between the wall W1 and a position in which the coupling lens 40 is disposed, a wall W2 in a shape of a rib protruding from the second frame F2 is provided. The wall W2 protrudes from a position on the second frame F2 near a position in which the wall W1 and the second frame F2 are contact with each other. Thus, even if some factors such as manufacturing errors, imprecision in assembly, or secular changes in shape cause a gap to be made between the wall W1 and the second frame F2, the wall W2 may serve to prevent air from passing through that gap, so that entry of dust or the like into the section in which the semiconductor laser 20 is disposed can be prevented more effectively. The wall W2 extends from the inner surface of the second frame F2 down to a position enough to overlap the coupling lens 40 but to escape undesirable blocking to entry of the light beam into the coupling lens 40.

With the construction described above, the wall W1 formed integrally with the frame 100, and the outer walls FW1, FW2 of the frame 100 surround the semiconductor laser 20 and the aperture stop plate 30; therefore, a portion of the frame 100 on which the semiconductor laser 20 is mounted can be enhanced in strength. Furthermore, as compared with an alternative configuration in which an aperture stop is formed in a wall provided integrally with the frame, the aperture stop plate 30 can be provided more easily with the opening A2 formed as an optical aperture stop more precisely in the metal plate. Moreover, the aperture stop is provided in a separate part (i.e., aperture stop plate 30), and is thus replaceable, which facilitates standardization of the frame design and makes the frame shareable among different models and flexibly conformable to the change in specifications of the light source and other components.

Figure 6:
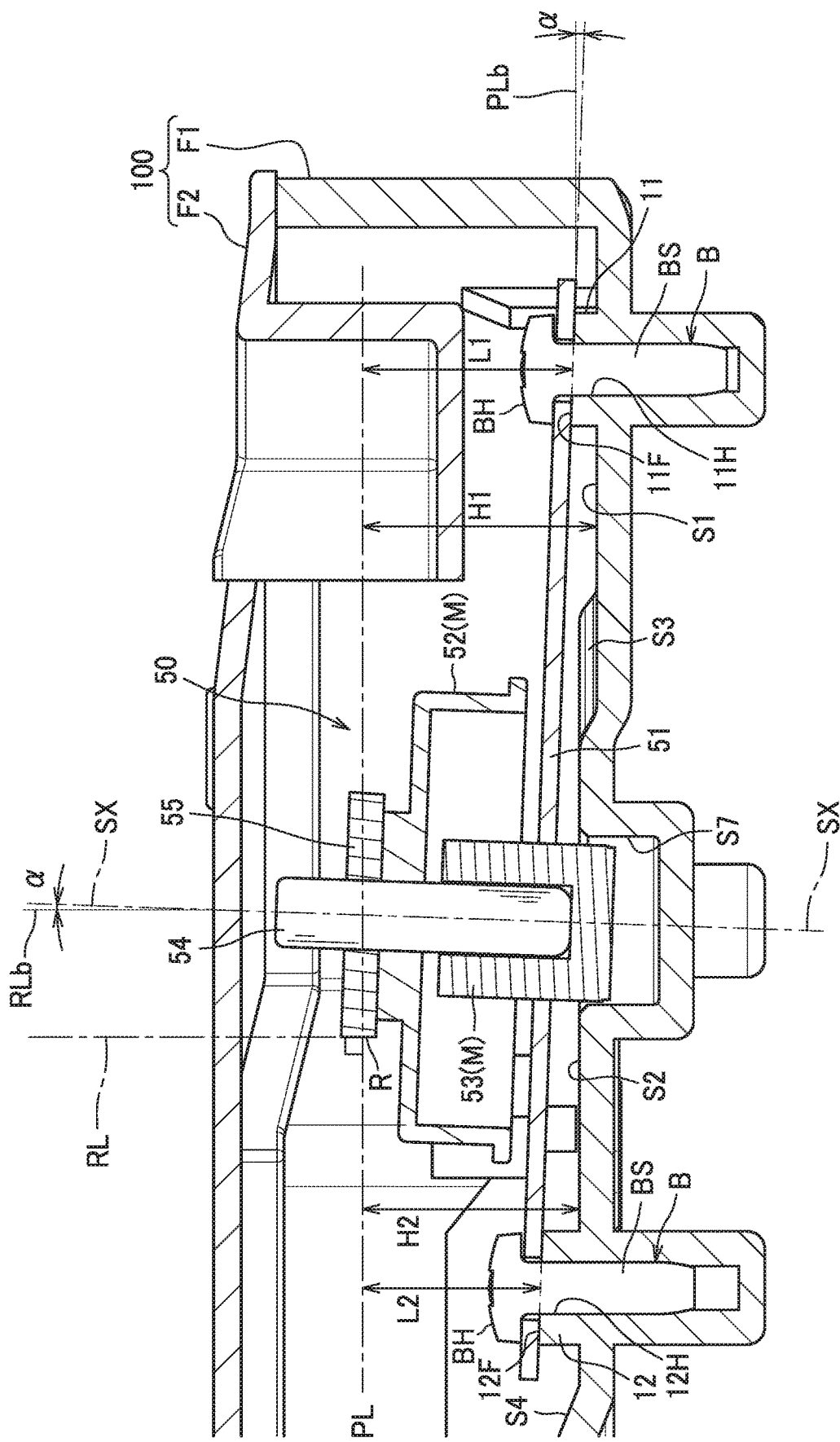
FIG. 6 is a sectional view taken along line II-II of FIG. 3.

As shown in FIG. 6, the optical deflector 50 includes a base plate 51 made of metal, a motor M, and a polygon mirror 55. The motor M includes a rotor 52, a bearing part 53, and a shaft 54. The bearing part 53 of the motor M is held in the base plate 51 in such a manner that an axis SX of rotation of the motor M is orthogonal to the base plate 51. The polygon mirror 55 is fixed to the rotor 52. The rotor 52, the shaft 54 and the polygon mirror 55 are caused to rotate together about the axis SX of rotation. The base plate 51 has an exciting coil of the motor M and a control circuit formed thereon.

The polygon mirror 55 is a member having a plurality of reflecting surfaces R disposed equidistantly from the axis SX of rotation. For example, FIG. 2 illustrates the polygon mirror 55 having four reflecting surfaces R. The polygon mirror 55 is of molded plastic. The reflecting surfaces R are provided as a reflective film of aluminum or other suitable material evaporated onto the surfaces of the plastic polygon mirror 55.

As shown in FIG. 6, the plurality of reflecting surfaces R of the polygon mirror 55 are tilted at a predetermined angle α (e.g., 2°) with respect to the axis SX of rotation in a plane containing the axis SX of rotation. FIG. 6 shows a straight line RL on one reflecting surface R and a straight line RLb parallel to the straight line RL (i.e., to the one reflecting surface R). The optical deflector 50 is tilted at the same predetermined angle α so that the one reflecting surface R, i.e., one of the plurality of reflecting surfaces R of the polygon mirror 55, which is oriented to reflect a light beam from the semiconductor laser 20 toward an optical axis $AX_M$ (see FIG. 3) in the main scanning direction of the f-theta lens 60 (i.e., toward the center of a scanning range in the main scanning direction) is orthogonal to a scanning plane PL containing the optical axes in cross sections taken along the sub scanning direction of the f-theta lens 60. To be more specific, the base plate 51 orthogonal to the axis SX of rotation is slanted at the predetermined angle α with respect to the scanning plane PL. FIG. 6 shows a straight line PLb parallel to the scanning plane PL.

The polygon mirror 55 is caused to rotate at a constant rotational speed in a direction indicated by an arrow in FIG. 2 about the axis SX of rotation, to thereby deflect in the main scanning direction a light beam having passed through the coupling lens 40. Specific construction and arrangement of the optical deflector 50 will be described later.

The f-theta lens 60 has an elongate shape, and is arranged to allow a light beam reflected and thus deflected by the polygon mirror 55 to pass therethrough. The f-theta lens 60 is configured to focus the light beam thus deflected by the optical deflector 50 into a spot-like image on the surface to be scanned with the light beam. The f-theta lens 60 is also configured to correct an optical face tangle error of the reflecting surface R of the polygon mirror 55. The f-theta lens 60 has f-theta characteristics such that the light beam deflected at a constant angular velocity by the polygon mirror 55 is converted into a light beam with which the target surface is scanned at a constant linear velocity.

The turning mirror 70 is a reflector that reflects a light beam. The turning mirror 70 is made, for example, of a glass plate and a high-reflectivity material evaporated on the glass plate. The turning mirror 70 has an elongate shape. The turning mirror 70 is configured to reflect a light beam having passed through the f-theta lens 60 toward the surface to be scanned.

A description is now given of a structure with which two end portions of the turning mirror 70 are located in place and fixed to the first frame F1. As shown in FIG. 3, the turning mirror 70 is disposed to have its end portions each located adjacent to a corresponding outer wall FW3 of the first frame F1 and its side portion located adjacent to an outer wall FW4 of the first frame F1. A pair of walls W4 are provided inside the first frame F1. The pair of walls W4 are used to locate and fix the turning mirror 70 to the first frame F1. The walls W4 extend parallel to the outer wall FW4 (i.e., in the direction of the length of the turning mirror 70).

The end portions of the turning mirror 70 are fixed respectively on the walls W4 of the first frame F1 with holding members SS. The turning mirror 70 is located in place in the direction of the optical axis because surfaces of the end portions facing to a side on which the f-theta lens 60 is disposed are in contact with the walls W4, respectively. Each holding member SS is a part made of leaf spring shaped like a clip. The holding member SS holds the corresponding wall W4 and the corresponding end portion of the turning mirror 70 together to retain the turning mirror 70 in position.

The first frame F1 further includes a wall W3 and a wall W5 raised from the bottom surface S of the first frame F1, in addition to the wall W4 described above, near each end portion of the turning mirror 70 inside the corresponding outer wall FW3.

The wall W3 extends from the outer wall FW4 of the first frame F1 along the outer wall FW3 in a direction orthogonal to the direction of the length of the turning mirror 70, so that the wall W3 and the outer wall FW3 together form a double-wall structure. The wall W3 is raised from the bottom surface S of the first frame F1, extending in the sub scanning direction, to a height equal to a height of the outer wall FW3 (i.e., to such an extent that its upper end comes in contact with the second frame F2). See FIG. 2.

The wall W5 is arranged in the first frame F1, in a position inwardly of the wall W3 in the direction of the length of the turning mirror 70. The wall W5 is shaped like a rib extending parallel to the wall W3. The wall W4 is raised from the bottom surface S of the first frame F1, extending in the sub scanning direction, to such a height that its upper end is flush with the upper surface of the end portion of the turning mirror 70. See FIG. 2. The Wall W4 connects the wall W3 and the wall W5.

As described above, each of the walls W4 on which the turning mirror 70 is fixed is reinforced by the wall W3 and wall W5; therefore, the walls W4 can stably support the turning mirror 70.

The BD sensor 80 is a sensor that receives a light beam in a position closer to an upstream end of a scanning range in the main scanning direction of the light beam deflected by the optical deflector 50, to generate a detection signal. The BD sensor 80 is provided on the circuit board CB.

The BD condenser lens 90 is a lens through which a light beam deflected by the optical deflector 50 is directed to the BD sensor 80.

The circuit board CB is a substrate on which circuitry (not shown) is provided to power the semiconductor laser 20. The BD sensor 80 is mounted on the circuit board CB. The circuit board CB is fastened to the outer wall FW2 of the first frame F1 with a screw B.

Openings M1, M2, M3, and M4 shown in FIG. 3 are structures for use in installing the frame 100 of the optical scanning device 1 in an apparatus which comprises a surface to be scanned with a light beam from the optical scanning device 1. The openings M1, M2, M3, and M4 are arranged across the turning mirror 70 from the outer wall FW4 of the first frame F1, within bounds set by ends of the turning mirror 70 in the direction of the length of the turning mirror 70. Accordingly, the optical scanning device 1 can be installed by screwing screws (not shown) or the like into the openings M1, M2, M3, and M4.

Referring back to FIG. 2, a pair of beam detection holes C are provided in the outer wall FW4 of the first frame F1. The beam detection holes C are arranged to allow a light beam deflected by the optical deflector 50 to pass through the outer wall FW4 when the turning mirror 70 is not mounted. The beam detection holes C are used to detect the light beam at the ends of scan in the main scanning direction for inspection in the process of manufacture of the optical scanning device 1.

In the optical scanning device 1 described above, a light beam emitted from the semiconductor laser 20 travels through the opening A2 of the aperture stop plate 30 and the coupling lens 40 to the optical deflector 50, at which the light beam is deflected and sweeps along the length of the f-theta lens 60; the light beam having passed through the f-theta lens 60 turns its course at the turning mirror 70 toward the target surface (the surface of the photoconductor drum 181 as shown in FIG. 1), so that the surface is scanned with the rapidly sweeping light beam.

Next, a description will be given of structural features introduced for mounting the optical deflector 50 to the frame 100 (first frame F1).

As shown in FIG. 4, the bottom surface S of the first frame F1 includes regions S1, S2, S6. The regions S1, S2, S6 are surfaces parallel to the scanning plane PL (see FIG. 6) containing the optical axes in respective cross sections taken along the sub scanning direction of the f-theta lens 60. The region S2 extends from part of an area 50S to be occupied by the optical deflector 50, to a location under the f-theta lens 60. With reference to the region S2, the region S1 that overlaps part of the area 50S is one tier lower down. As the region S1 and the region S2 are different in level, a stepped portion S3 which smoothly joins the region S2 and the region S1 is provided along a border between the region S1 and the region S2.

The region S6 that is provided between the region S2 (including the area 50S to be occupied by the optical deflector 50) and the outer wall FW2 (in which the semiconductor laser 20 is disposed) is one tier higher up, with reference to the region S2. A slope S4 and a slope S5 are provided between the region S2 and the region S6. The slope S4 is provided adjacent to a semiconductor laser side (the side facing to the semiconductor 20) of an area of the region S2 which overlaps the area 50S to be occupied by the optical detector 50. The slope S5 is provided adjacent to an upstream end (the end closer to an end of the f-theta lens 60 upstream of the main scanning direction of the light beam deflected by the optical deflector 50) of an area of the region S2 over which the f-theta lens 60 is provided.

The location of the slope S5 is nearer to the outer wall FW2 of the first frame F1 to which the circuit board CB is fixed, than the location of the slope S4.

In an area of the region S2 corresponding to a location in which the bearing part 53 of the motor M of the optical deflector 50 is disposed, a recess S7 is provided. The recess S7 provides a hollow space that receives a downwardly protruding portion of the bearing part 53 of the optical deflector 50. The recess S7 has such a shape and dimensions as to allow the bearing part 53 to be kept out of contact with the bottom surface S of the first frame F1 (see FIG. 6).

As described above, the rotor 52 to which the polygon mirror 55 is fixed is so positioned that the axis SX of rotation is orthogonal to the base plate 51, and the reflecting surfaces R of the polygon mirror 55 are tilted at a predetermined angle α with respect to the axis SX of rotation in a plane containing the axis SX of rotation. Accordingly, in order that the reflecting surface R which a light beam enters is rendered orthogonal to the scanning plane PL containing the optical axes in respective cross sections taken along the sub scanning direction of the f-theta lens 60, the base plate 51 is in a position slanted at the angle α from the scanning plane PL, as shown in FIG. 6.

The base plate 51 is in contact with bearing surfaces 11F, 12F, 13F, 14F provided respectively at top ends (distal ends) of four protrusions 11, 12, 13, 14 protruding from the bottom surface S of the first frame F1 so that the positions of the base plate 51 in the sub scanning direction are fixed (distances from the scanning plane PL to the locations at which the base plate 51 is fixed are determined). Thus, the base plate 51 can be slanted by varying the distances from the scanning plane PL to the bearing surfaces 11F, 12F, 13F, 14F in the sub scanning direction.

As shown in FIG. 4, the bearing surfaces 11F, 12F, 13F, 14F have screw holes 11H, 12H, 13H, 14H, respectively, and the base plate 51 has insertion holes P1, P2, P3, P4 in locations corresponding to the screw holes 11H, 12H, 13H, 14H, respectively. The base plate 51 further has locating holes P5, P6 engageable with locating bosses 15, 16 protruding from the bottom surface S of the first frame F1. The locating hole P6 is shaped like a notch that opens at an edge of the base plate 51. It is to be understood that the locating hole P6 may not be a notch-shaped hole, but may be an elongate hole.

The locating bosses 15, 16 may preferably be located at two spots between which the axis SX of rotation is positioned so as to ensure the positioning accuracy. However, precise locations symmetric with respect to the axis SX of rotation may not be required. In the present embodiment, as shown in FIG. 3, the locating bosses 15, 16 are located in such positions that the straight-line segments drawn from the respective centers of the locating bosses 15, 16 to the axis SX of rotation form an angle β that is an obtuse angle (i.e., any angle from 90 to 180 degrees). This arrangement of the locating bosses 15, 16 facilitates precise positioning of the base plate 51.

Figure 7:
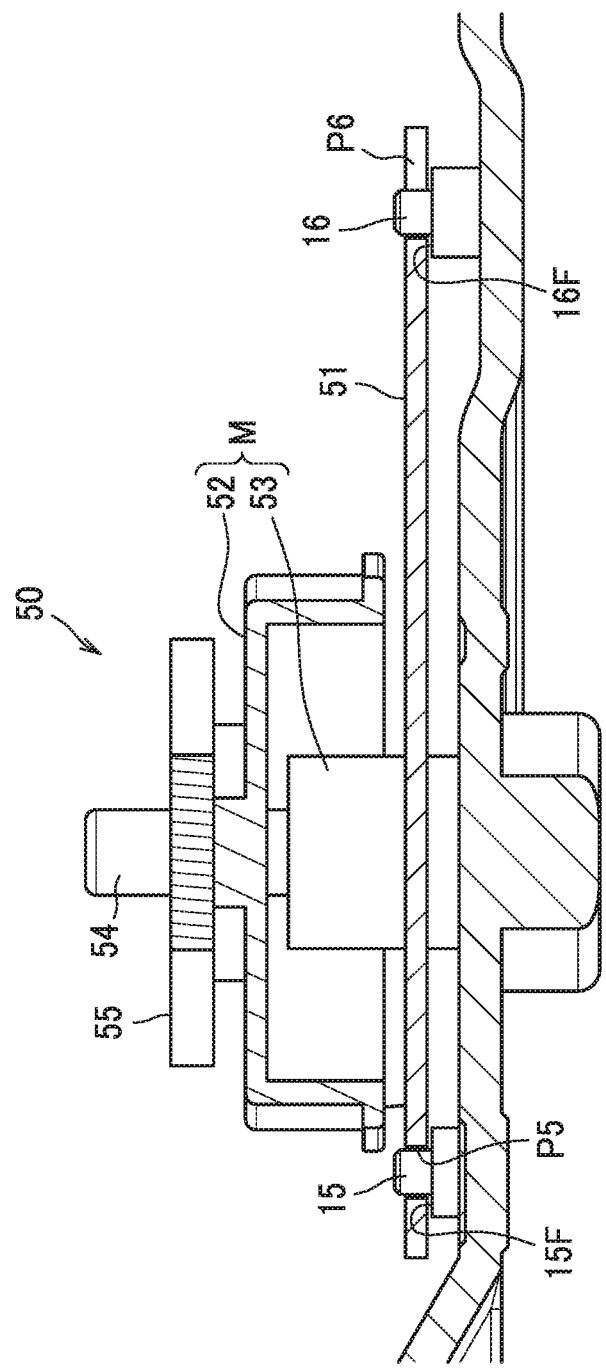
FIG. 7 is a sectional view taken along line III-III of FIG. 3.

When the optical deflector 50 is mounted on the first frame F1, first, the locating holes P5, P6 of the base plate 51 are fitted respectively on the locating bosses 15, 16 of the first frame F1 as shown in FIG. 7, to locate the base plate 51 in a predetermined position in a plane parallel to the scanning plane PL. Then, screws B are screwed in the screw holes 11H, 12H, 13H, 14H of the bearing surfaces 11F, 12F, 13F, 14F, so that the base plate 51 is fastened tight on the bearing surfaces 11F, 12F, 13F, 14F. In this way, the base plate 51 is located in a predetermined position in the sub scanning direction (i.e., direction orthogonal to the scanning plane PL).

According to this embodiment as described above, the shaft 54 (or bearing part 53) in the tilted position need not be used for positioning the polygon mirror 55; therefore, accurate positioning can be achieved.

As shown in FIG. 6, the bearing surfaces 11F, 12F, 13F, 14F are slanted at the angle α with respect to the scanning plane PL in accordance with the tilt angle of the base plate 51. Thus, edges of the bearing surfaces 11F, 12F, 13F, 14F do not engage the undersurface of the base plate 51, so that the base plate 51 can be stably supported by the bearing surfaces 11F, 12F, 13F, 14F in face-to-face contact with the undersurface of the base plate 51.

It is appreciated that the screw holes 11H, 12H, 13H, 14H may be slanted in accordance with the slanted bearing surfaces 11F, 12F, 13F, 14F, but in view of the manufacturing process, it is easy and convenient to form the screw holes 11H, 12H, 13H, 14H orthogonal to the bottom surface S. In this case, an axis BA of each screw B is orthogonal to the scanning plane PL as shown in FIG. 8, and thus when the shank BS of the screw B is screwed into the screw hole 11H, 12H, 13H, 14H, the head BH of the screw B brought into contact with the upper surface of the base plate 51 slanted with respect to the scanning plane PL is, in actuality, not entirely in contact but out of contact at one side, with the result that the load received by the base plate 51 is concentrated in a narrow area.

Figure 8:
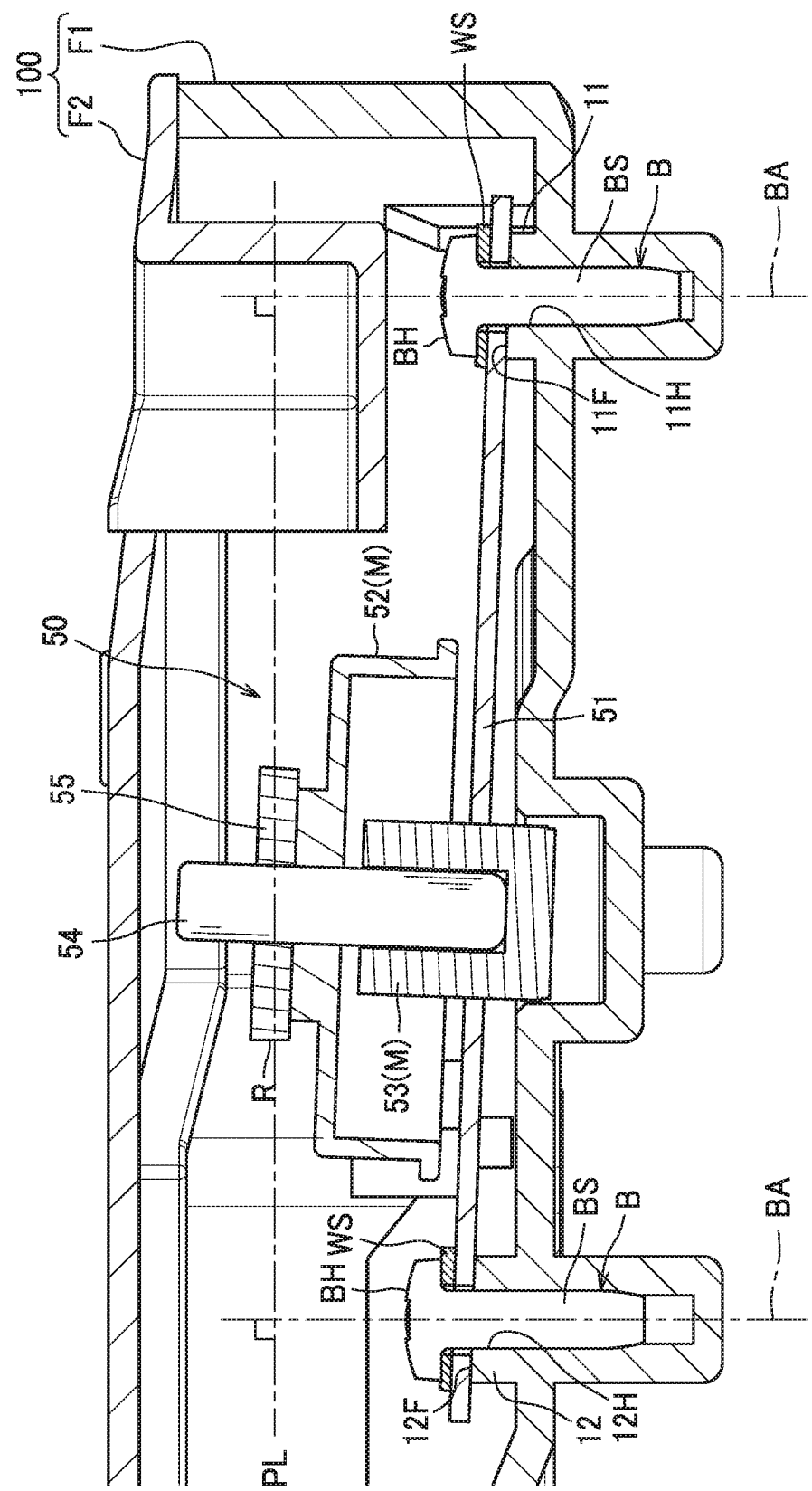
FIG. 8 is a sectional view of a structure for mounting the polygon mirror in a frame.

With this in view, as shown in FIG. 8, a plastic spacer WS may be disposed between the head BH of each screw B and the base plate 51, so that the load from the head BH of the screw B can be received on a wide area of the upper surface of the base plate 51.

With this configuration in which the plastic spacer WS is disposed between the head BH of the screw B and the base plate 51, deformation of the plastic spacer WS resulting from tightening of the screw B causes the head BH of the screw B and the spacer WS to entirely come in contact with each other. In this way, an undesirable concentration of the tightening load from the head BH of the screw B in a small area on the upper surface of the base plate 51 can be prevented.

As shown in FIG. 6, a distance L1 from the scanning plane PL to the center of the bearing surface 11F of the first protrusion 11 is longer than a distance L2 from the scanning plane PL to the center of the bearing surface 12F of the second protrusion 12 (L1>L2).

On the other hand, one of the four protrusions 11, 12, 13, 14 (first protrusion 11) is disposed on the region S1 of the bottom surface S. Three protrusions other than the first protrusions 11 (second protrusion 12, third protrusion 13, and third protrusion 14) are disposed on the region S2 of the bottom surface S. Since the region S1 and the region S2 are different in level as described above, a distance H1 from the scanning plane PL to the region S1 is longer than a distance H2 from the scanning plane PL to the region S2 (H1>H2).

With this configuration, a difference between a distance from a base end (region S1) of the protrusion 11 to the top end (bearing surface 11F) of the protrusion 11, i.e., the length of the protrusion 11 (H1-L1) and a distance from a base end (region S2) of the protrusion 12 to the top end (bearing surface 12F) of the protrusion 12, i.e., the length of the protrusion 12 (H2-L2) is smaller in comparison with an alternative configuration in which no difference in level is provided in the bottom surface S on which the protrusions are disposed.

In particular, among the protrusions 11, 12, 13, 14, the protrusion 11 having the bearing surface 11F farthest from the scanning plane PL is disposed on the region S1, and the protrusion 12 having the bearing surface 12F nearest to the scanning plane PL is disposed on the region S2, to thereby narrow down the difference in length between the protrusion 11 and the protrusion 12 having bearing surfaces 11F, 12F between which the difference in level is the greatest.

In the present embodiment, as described above, the following advantageous effects can be achieved.

Since the polygon mirror 55 having reflecting surfaces R tilted at the predetermined angle α with respect to the axis SX of rotation of the motor M is adopted, a plastic polygon mirror which can be formed using a mold having a draft can be selected. With this in view, the polygon mirror made of plastic is easy to manufacture at a great saving of cost, and thus is more advantageous in comparison with polygon mirrors made of metal.

Furthermore, in the present embodiment, while the axis SX of rotation of the polygon mirror 55 can be tilted, variations in the lengths of the plurality of protrusions 11, 12, 13, 14 of which the top ends serve as the bearing surfaces 11F, 12F, 13F, 14F on which the base plate 51 are placed can be minimized; therefore, vibrations associated with the rotation of the polygon mirror 55 can be minimized.

Also, in the present embodiment, in order to make the distance from the scanning plane PL to the region S1 on which the first protrusion 11 is disposed different from the distance from the scanning plane PL to the region S2 on which the second protrusion 12 is disposed, the border between the region S1 and the region S2 which are parallel to the scanning plane PL is stepped and provided with a stepped portion S3. Therefore, the frame 100, in particular, a portion of the frame 100 on which the polygon mirror 55 (configured to be caused to rotate) is mounted is reinforced in structure.

Figure 9:
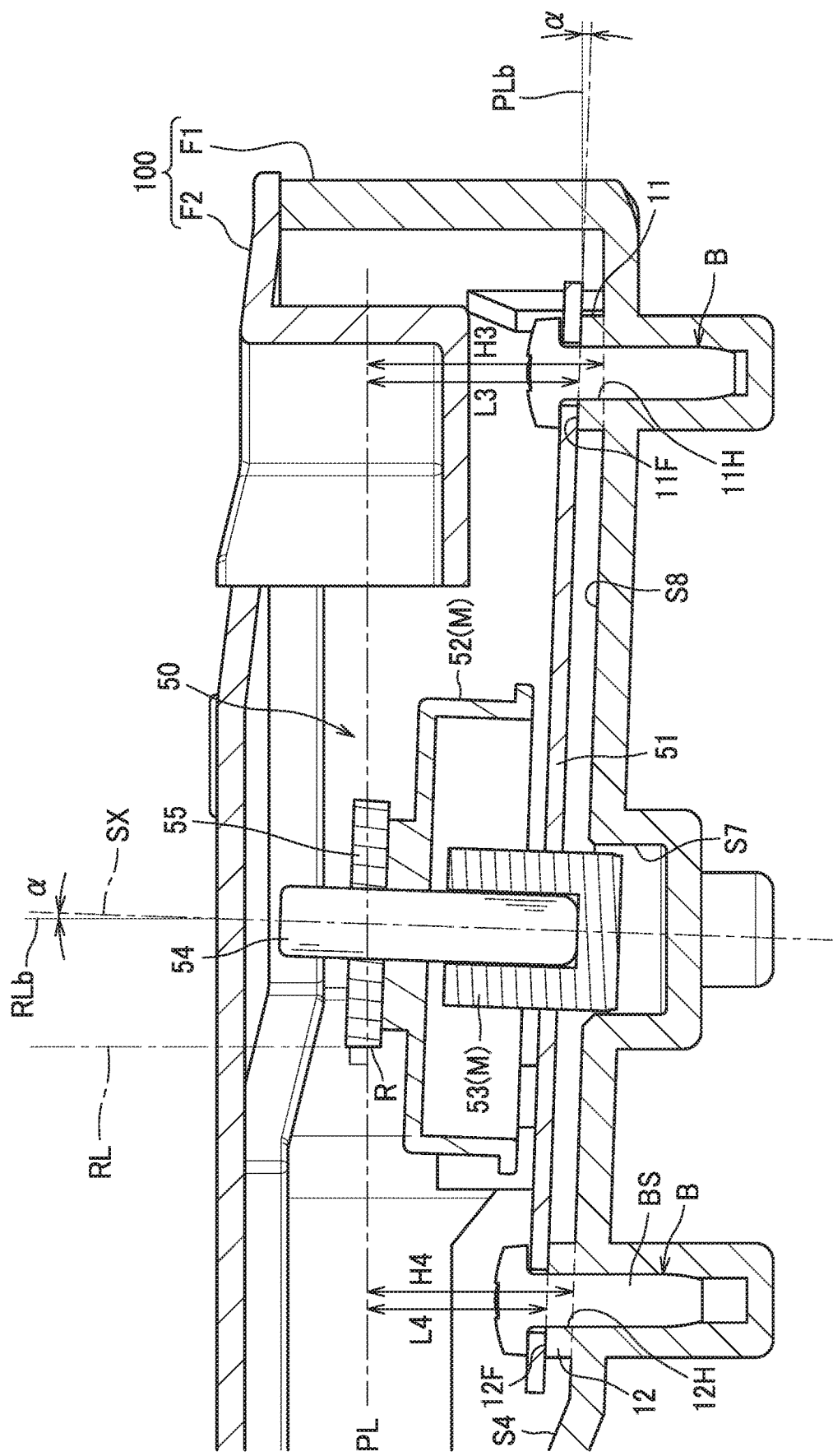
FIG. 9 is a sectional view showing a structure of the frame.

The structure for providing a difference in level among regions on which a plurality of protrusions are disposed is not limited to the above-described configuration in which a stepped portion is provided. As shown in FIG. 9, the regions of the bottom surface S on which a plurality of protrusions are disposed may be made up of a slanted surface S8 without any step. In the embodiment shown in FIG. 9, a distance H3 from the scanning plane PL to a region on which the first protrusion 11 is disposed and a distance H4 from the scanning plane PL to a region on which the second protrusion 12 is disposed are different, satisfying the inequality: H3>H4.

In this configuration as well, a distance L3 from the scanning plane PL to the bearing surface 11F of the first protrusion 11 is longer than a distance L4 from the scanning plane PL to the bearing surface 12F (L3>L4). The distance H3 from the scanning plane PL to the region of the bottom surface S (slanted surface S8) on which the first protrusion 11 is disposed is longer than the distance H4 from the scanning plane PL to the region of the bottom surface S (slanted surface S8) on which the second protrusion 12 is disposed (H3>H4).

Accordingly, a difference between the length of the protrusion 11 (H3-L3) and the length of the protrusion 12 (H4-L4) is smaller in comparison with an alternative configuration in which the region of the bottom surface on which the first protrusion 11 and the second protrusion 12 are disposed is not slanted. If the slanted surface S8 is configured to be slanted at the same predetermined angle α as that at which the base plate 51 is slanted, all the protrusions 11, 12, 13, 14 can be configured to have the same length.

In the above-described embodiment, four protrusions are disposed as a plurality of protrusions protruding from the bottom surface S by way of example, but the number of protrusions is not limited to four. For the purposes of accurate positioning and stable support for the optical deflector 50, the number of protrusions may preferably be three or more. The plurality of protrusions may preferably be arranged to have the axis of rotation of the polygon mirror positioned within a polygon formed with straight-line segments connecting the centers of the protrusions.

In the above-described embodiment, one of the plurality of protrusions (first protrusion 11) is disposed on the first region S1 to which the distance L1 from the scanning plane PL is different from the distance L2 from the scanning plane PL to the second region S2 on which the other protrusions 12, 13, 14 are disposed; however, an alternative configuration may be such that depending on the arrangement of the plurality of protrusions, two or more protrusions may be disposed on a region different from a region on which the other protrusions are disposed, or such that all the protrusions may be disposed on respective regions to which distances from the scanning plane PL are different from one another.

In the above-described embodiment, the polygon mirror 55 having four reflecting surfaces R is illustrated by way of example; however, the number of reflecting surfaces is not limited to this specific example. For example, a polygon mirror having six reflecting surfaces may be implemented in an alternative configuration consistent with the present invention.

The elements described in the above embodiment may be implemented selectively and in combination.

What is claimed is:

1. An optical scanning device comprising:
a light source configured to emit a light beam;
an optical deflector configured to deflect, in a main scanning direction, a light beam emitted from the light source;
a scanning lens configured to focus the light beam deflected by the optical deflector on a surface to be scanned; and
a frame on which the light source, the optical deflector and the scanning lens are fixed, the frame having a bottom surface,
wherein the optical deflector includes a base plate, a rotor having an axis of rotation orthogonal to the base plate, and a polygon mirror fixed to the rotor, the polygon mirror having a plurality of reflecting surfaces tilted at a same predetermined angle with respect to the axis of rotation in a plane containing the axis of rotation,
wherein the frame includes a plurality of protrusions protruding from the bottom surface, the plurality of protrusions having a plurality of bearing surfaces at respective distal ends thereof, the plurality of bearing surfaces being in contact with the base plate, the plurality of protrusions including a first protrusion and a second protrusion,
wherein the bottom surface includes a first region on which the first protrusion is disposed, and a second region on which the second protrusion is disposed, the first region and the second region being parallel to a scanning plane containing optical axes in cross sections taken along a sub scanning direction of the scanning lens, the first region being located at a first distance from the scanning plane, the second region being located at a second distance from the scanning plane, the first distance being different from the second distance,
wherein a stepped portion is provided between the first region and the second region and joins the first region and the second region, the first region being defined at a first level and the second region being defined at a second level different from the first level, and
wherein the base plate is slanted at the same predetermined angle with respect to the scanning plane, and is located in a position in which the base plate and the stepped portion overlap one another when viewed in a direction of the axis of rotation.

2. The optical scanning device according to claim 1, wherein the plurality of bearing surfaces are slanted with respect to the scanning plane.

3. The optical scanning device according to claim 1, further comprising a plurality of screws by which the base plate is fastened to the plurality of bearing surfaces, respectively, wherein an axis of each of the plurality of screws is orthogonal to the scanning plane.

4. The optical scanning device according to claim 3, further comprising a plurality of spacers made of plastic, wherein each of the plurality of screws includes a head and a shank, and each of the plurality of spacers is disposed between the head of a corresponding screw and the base plate.

5. The optical scanning device according to claim 1, wherein the frame further comprises a plurality of bosses protruding from the bottom surface, and
the base plate has a plurality of locating holes through which the plurality of bosses are inserted, respectively.

6. The optical scanning device according to claim 5, wherein an angle formed by two straight-line segments extending from centers of two of the plurality of bosses to the axis of rotation is in a range of 90 to 180 degrees inclusive.

7. The optical scanning device according to claim 1, wherein when one of the plurality of reflecting surfaces reflects a light beam received from the light source to a center of a scanning range in the main scanning direction of the scanning lens, the one of the plurality of reflecting surfaces is orthogonal to an optical axis in a cross section taken along the sub scanning direction of the scanning lens.

8. The optical scanning device according to claim 1, wherein the polygon mirror is made of plastic.

* * * * *